(12) United States Patent
Muff

(10) Patent No.: US 6,686,764 B2
(45) Date of Patent: Feb. 3, 2004

(54) APPARATUS AND METHOD FOR REDUCING REFLEXIONS IN A MEMORY BUS SYSTEM

(75) Inventor: Simon Muff, Hohenkirchen (DE)

(73) Assignee: Infineon Technologies AG, Munich (DE)

(*) Notice: Subject to any disclaimer, the term of this patent is extended or adjusted under 35 U.S.C. 154(b) by 29 days.

(21) Appl. No.: 10/145,579

(22) Filed: May 14, 2002

(65) Prior Publication Data

US 2002/0178318 A1 Nov. 28, 2002

(30) Foreign Application Priority Data

May 17, 2001 (DE) .......................... 101 24 176

(51) Int. Cl.⁷ .............................................. H03K 19/23
(52) U.S. Cl. ........................................................ 326/30
(58) Field of Search ................................ 326/30–34, 16, 326/87

(56) References Cited

U.S. PATENT DOCUMENTS

| 5,771,262 A |   | 6/1998  | Benayoun et al. ........ 375/257 |
| 6,166,563 A | * | 12/2000 | Volk et al. ..................... 326/87 |
| 6,541,996 B1 | * | 4/2003 | Rosefield et al. ............. 326/30 |

FOREIGN PATENT DOCUMENTS

DE            69120606 T2    7/1996    ........... H04L/12/40

OTHER PUBLICATIONS

"Fachkunde Industrieelektronik und Informationstechnik," 7th Edition, Verlag Europa–Lehrmittel, Nourney, Vollmer GmbH & Co., Haan 1999, pp. 431–432, ISBN 3–8085–3247–5. Translation provided.

Meinke, H. H., "Einführung in die Elektrotechnik höherer Frequenzen," 2nd Revised Edition, Springer–Verlag, Berlin 1965, pp. 172–191. Translation provided.

* cited by examiner

*Primary Examiner*—Anh Tran
(74) *Attorney, Agent, or Firm*—Winthrow & Terranova, PLLC

(57) ABSTRACT

The present invention relates to an apparatus and a method for reducing reflexions in a bus for transmitting data. The device comprises an output, which is connected to an input of the bus, a device for sending a test signal into the input of the bus (102), the device for sending being connected to the output, a device for receiving reflexions from the bus, which is connected to the output, and a device for evaluating the reflexions from the bus, in order to supply an evaluation result, and for setting an impedance at the output as a function of the evaluation result, in order to reduce the reflexions from the bus.

24 Claims, 3 Drawing Sheets

APPARATUS AND METHOD FOR REDUCING REFLEXIONS IN A MEMORY BUS SYSTEM

This application claims the benefit of German application number 101 24 176.3, filed May 17, 2001, currently pending, the disclosure of which is hereby incorporated by reference in its entirety.

FIELD OF THE INVENTION

The present invention relates to an apparatus and a method for reducing reflexions in a memory bus system in which data are sent and received.

BACKGROUND OF THE INVENTION

In conventional buses, such as memory subsystem buses in computer systems, reflexions or multiple reflexions typically occur in the bus during the sending and receiving of data at the connecting points of components such as, for example, memory components. Further causes for reflexions are, in general, branches of the bus with a different load, changes in impedance inside the bus and, in general, the topology of the bus.

In the prior art, such reflexions are usually reduced with the aid of passive or active terminations, the active terminations being optimized only for a specific operating point in the working range of the bus, and reducing the reflexions optimally only there.

A problem in the prior art therefore consists in that the measures for reducing reflexions in buses do not reduce reflexions for a wide working range of the bus. Such a working range is determined, for example, by the distinguishability of the sent and received data, that is to say, for example, the bit pattern, the temporal changes in the bus characteristics and the connecting characteristics of components on the bus, and the frequency of the sent and received data signals. If the reflexions are not adequately reduced, this can lead, inter alia, to a loss in the temporal alignment of the data in the bus and, for example, in the case of high frequencies to smearing or rounding of binary signal edges.

The object of the present invention therefore consists in creating an apparatus and a method for reducing reflexions in a bus for transmitting data, which permit a reduction in reflexions over the entire working range of the bus.

This object is achieved by means of an apparatus for reducing reflexions in a bus for transmitting data in accordance with claim 1, a controller for a bus in accordance with claim 16, a memory component in accordance with claim 17, and a method for reducing reflexions in a bus for transmitting data in accordance with claim 18.

SUMMARY OF THE INVENTION

One advantage of the apparatus and the method of the present invention consists in that the same permit a reduction in reflexions in a bus over a wide working range of the bus in conjunction with variations in the frequency of the data signal and the characteristics of the bus etc.

A further advantage of the apparatus and the method of the present invention consists in that in the case of high frequencies, in particular, reflexions are reduced which can effect strong smearing or rounding of signal edges.

Advantageous developments and improvements of the apparatus specified in claim 1 and of the method specified in claim 17 are to be found in the subclaims.

In accordance with a preferred development of the apparatus of the present invention, the device for evaluating and setting is arranged in order to control the impedance as a function of the evaluation result in such a way that the latter is constant over the frequency.

An advantage of this preferred development consists in that, particularly in the case of high frequencies, smearing or rounding of signal edges is avoided by keeping the impedance constant over the entire frequency range.

In accordance with a further preferred development of the apparatus of the present invention, the device for receiving is a detecting amplifier which detects the settling time and the hold time of data, which are represented by the test signal, at the device for receiving.

In accordance with a further preferred development of the apparatus of the present invention, the device for evaluating and setting is, furthermore, arranged in order to set the impedance in such a way that the settling time and the hold time are optimized.

In accordance with a further preferred development of the apparatus of the present invention, the device for evaluating and setting is arranged, furthermore, in order to set the impedance in such a way that overshooting and undershooting in the bus are reduced.

In accordance with a further preferred development of the apparatus of the present invention, the device for evaluating and setting is arranged, furthermore, in order to set the transmission strength and the time profile of the transmission strength of the device for sending in such a way that the data alignment in the bus is maintained.

In accordance with a further preferred development of the apparatus of the present invention, the device for evaluating and setting has a memory in which setting values for the impedance, the transmission strength and the time profile of the transmission strength for assigned test signals are stored.

In accordance with a further preferred development of the apparatus of the present invention, the test signal is a digital signal which has a predefined bit pattern.

In accordance with a further preferred development of the present invention [sic], the impedance is a series impedance which has a first input, a second input and an output which is connected to the output, there being connected between the first input and the output a first impedance whose impedance value can be controlled, and between the output and the second input a second impedance whose impedance value can be controlled.

In accordance with a further preferred development of the present invention [sic], the first impedance has a first transistor whose impedance value can be controlled, and the second impedance has a second transistor whose impedance value can be controlled.

In accordance with a further preferred development of the apparatus of the present invention, the first transistor is connected to a first power supply in a controllable fashion via a third transistor, which is controlled by the device for evaluating and setting, and the second transistor is connected to a second power supply in a controllable fashion via a fourth transistor, which is controlled by the device for evaluating and setting.

In accordance with a further preferred development of the apparatus of the present invention, the first, second, third and fourth transistors in each case have a control input which is connected to the device for evaluating and setting.

In accordance with a further preferred development of the apparatus of the present invention, the first and the second transistor in each case have a JFET transistor, and the third and the fourth transistor in each case have a MOSFET transistor.

In accordance with a further preferred development of the apparatus of the present invention, the bus has a memory subsystem bus to which memory components can be connected.

In accordance with a further preferred development of the present invention [sic], the memory components have dynamic random access memory (DRAM) memory components.

In accordance with a preferred development of the method of the present invention, the steps of evaluating and setting have the step of controlling the impedance as a function of the evaluation result in such a way that the impedance is constant over the frequency.

In accordance with a further preferred development of the method of the present invention, the step of receiving further has [lacuna] the detection of the settling time and the hold time of data which are represented by the test signal.

In accordance with a further preferred development of the method of the present invention, the steps of evaluating and setting further have the step of setting the impedance in such a way that the settling time and the holding time are optimized.

In accordance with a further preferred development of the method of the present invention, the steps of evaluating and setting further have the step of setting the impedance in such a way that overshooting and undershooting in the bus are reduced.

In accordance with a further preferred development of the method of the present invention, the steps of evaluating and setting further have the step of setting the transmission strength and the time profile of the transmission strength during the step of sending in such a way that the data alignment in the bus is maintained.

In accordance with a further preferred development of the method of the present invention, the steps of evaluating and setting further have the step of storing the setting values for the impedance, the transmission strength and the time profile of the transmission strength for assigned test signals.

BRIEF DESCRIPTION OF THE DRAWING FIGURES

Preferred exemplary embodiments of the present invention are explained in more detail below with reference to the attached drawings, in which.

DETAILED DESCRIPTION OF THE PREFERRED EMBODIMENTS

Figure 1:
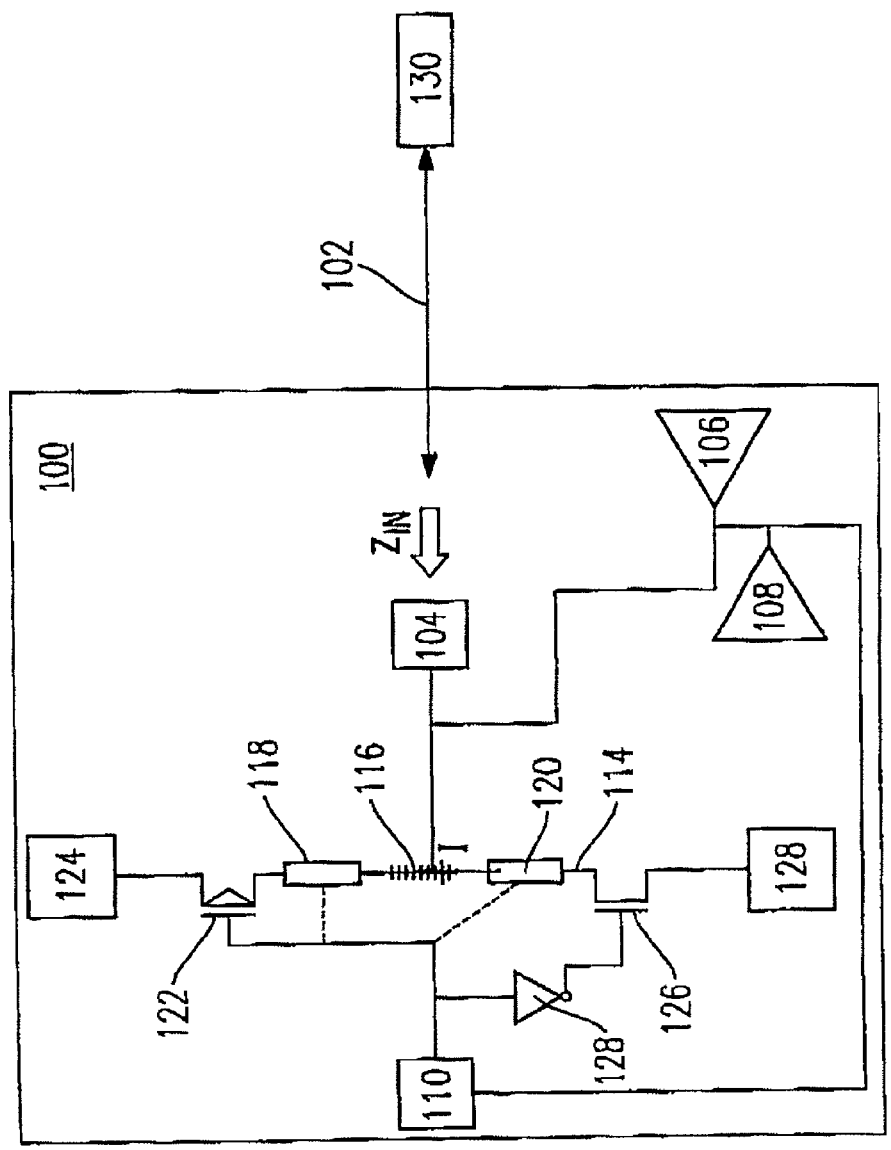
FIG. 1 shows an exemplary embodiment of an apparatus in accordance with the present invention.

FIG. 1 shows an exemplary embodiment of an apparatus according to the invention for reducing reflexions in a bus, in which data can be transmitted. The apparatus 100 for reducing reflexions in a bus 102 is connected to an input of the bus 102 via an output 104. The bus 102 is preferably a memory subsystem bus to which memory components (130), preferably dynamic random access memory (DRAM) memory elements can be connected.

The apparatus 100 has a device 106 for sending a test signal into the input of the bus 102, the device 106 for sending being connected to the output 104. The device 106 for sending is preferably a driver for driving test signals or data signals into the bus 102. The test signal is preferably a digital signal which preferably has a predefined bit pattern. The predefined bit pattern is a function of the system and preferably includes instructions with the aid of which the apparatus 100 is calibrated in order to reduce reflexions in the bus 102.

The apparatus 100 for reducing reflexions further has a device 108 for receiving reflexions from the bus 102, which is connected to the output 104. The device for receiving is preferably a detecting amplifier which detects the settling time and the hold time of data, which are represented by the test signal, at the device 108 for receiving.

The apparatus 100 for reducing reflexions further has a device 110 for evaluating the reflexions from the bus 102, in order to supply an evaluation result, and for setting the impedance $Z_{IN}$ at the output 104 as a function of the evaluation result, in order to reduce the reflexions from the bus 102. The device 110 for evaluating and setting is preferably arranged in such a way that the same controls the impedance $Z_{IN}$ as a function of the evaluation result in such a way that said impedance is constant over the frequency, and can, furthermore, preferably be arranged in order to set the impedance in such a way that the settling time and the hold time of data which are detected by the device 108 for receiving are optimized. The device 110 for evaluating and setting is preferably arranged, furthermore, in order to set the impedance $Z_{IN}$ in such a way that overshooting and undershooting in the bus 102 are reduced. The device 110 for evaluating and setting can be arranged, moreover, in order to set the transmission strength and the time profile of the transmission strength of the device 106 for sending in such a way that the data alignment in the bus 102 is maintained. In this case, the apparatus 100 sends a calibration sequence or bit sequence into the bus, preferably a memory channel for memory components, and the reflexions or the returning bits are detected by the device 108 for receiving, in order to calibrate appropriately the transmission strength and the time profile of the transmission strength of the device for sending. This relates, in particular, to the slew rate of the transmission strength in order to prevent a loss in the temporal tuning between the data or a temporal alignment between the data.

The device 110 for evaluating and setting the apparatus 100 can, furthermore, preferably have a memory in which setting values for the impedance, the transmission strength and the time profile of the transmission strength for assigned test signals can be stored. It is possible, for example, to store in this memory settings of the impedance $Z_{IN}$ which are suitable for optimally reducing reflexions in the bus 102 in the case of different bit patterns of the transmitted data or test signals and/or in the case of varying characteristics of the bus. The impedance ZIN can thereby be adapted dynamically to the type of data signals in the bus.

For the purpose of supplying an impedance at its output 104, the apparatus 100 preferably has an impedance in the form of a series impedance which has a first input 112, a second input 114 and an output 116 which is connected to the output 104, there being connected between the first input 112 and the output 116 a first impedance 118 whose impedance value can be controlled, and between the output 116 and the second input 114 a second impedance 120 whose impedance value can be controlled. The first impedance 118 preferably has a first transistor 118 whose impedance value can be controlled, and the second impedance 120 preferably has a second transistor 120 whose impedance value can be controlled.

The first transistor 118 is connected to a first power supply 124, which is preferably a positive power supply, in a controllable fashion via a third transistor 122, which is controlled by the device 110 for evaluating and setting, and the second transistor 120 is connected to a second power supply 128, preferably a negative power supply, in a controllable fashion via a fourth transistor 126, which is controlled by the device 110 for evaluating and setting.

The first, second, third and fourth transistors 118, 120, 122, 126 in each case have a control input which is connected, preferably via lines, to the device 110 for evaluating and setting. The first and the second transistors 118, 120 are in each case preferably a JFET transistor whose gate-source control voltage can be controlled via the control input. The third and the fourth transistors 122, 126 are preferably in each case a MOSFET transistor whose impedance between drain and source can be controlled by the gate-source control voltage at the control input of the respective transistor. In this case, the third transistor 122 is preferably a p-MOSFET transistor, and the fourth transistor 126 is preferably an n-MOSFET transistor which is connected via an inverter 128 to the device 110 for evaluating and setting. Via the gate-source voltages at the control input of the first and the second transistor 118, 120, the termination impedance and the profile of this impedance value over the frequency is set suitably by the device 110 for evaluating and setting, in order to reduce the reflexions in a bus optimally. The arrangement of the output 104 between the first transistor 118 and the second transistor 120 is usually denoted as a push-pull driver. The first or upper transistor 118 draws the voltage upward ("push"), and the second or lower transistor 120 draws the voltage downward ("pull").

Figure 2:
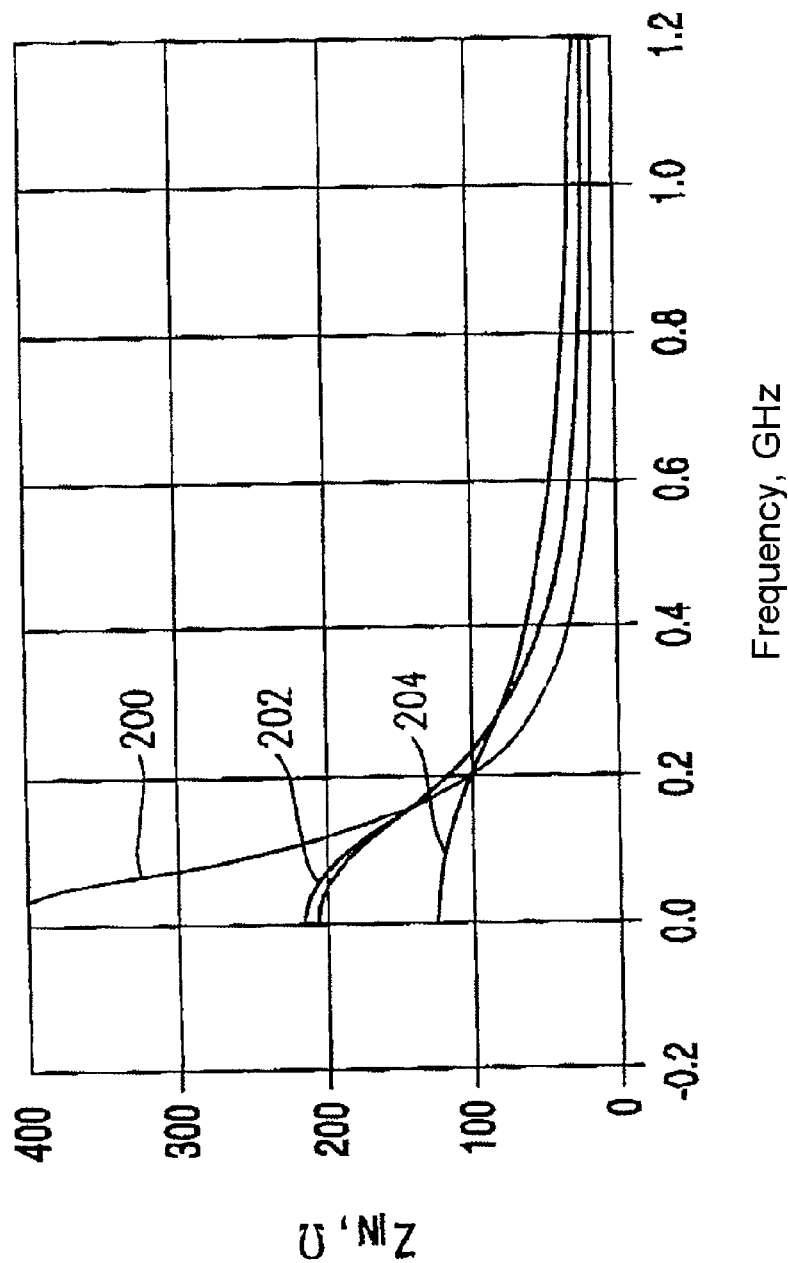
FIG. 2 shows the frequency-dependent behavior of the impedance at the output of the apparatus of FIG. 1.

FIG. 2 shows the frequency-dependent behavior of the impedance ZIN at the output 104 of the apparatus 100 for reducing reflexions. The curve 200 shows the profile of the frequency dependence of the impedance in the case of a lack of control of the impedance at the output 104 in such a way as to reduce reflexions in the bus. The curve 202 shows the profile of the impedance against the frequency in the case of optimization of the impedance ZIN by controlling the gate-source voltages of the third transistor 122 and of the fourth transistor 126. Finally, the curve 204 shows the profile of the impedance against the frequency for optimized control of the gate-source voltage of the third and fourth transistor 122, 126 and of the impedance of the first transistor 118 and of the second transistor 120, as a function of the gate-source voltage at the control inputs of the same. It may easily be seen that by controlling both the gate-source voltage of the third and the fourth transistor 1122, 126 and the impedance of the first and the second transistor 118, 210, it is possible to achieve a virtually constant profile of the impedance over the entire frequency range, and this reduces the rounding of binary signal edges, particularly in the case of high frequencies.

A further preferred exemplary embodiment of the present invention comprises a controller for a bus 102, which has the apparatus 100, described above, for reducing reflexions in a bus 102. In the case of the controller, the device 106 for sending is then a device 106 for sending data or data signals via the bus, which can also be used to send a test signal for calibrating the controller for the purpose of driving a bus optimally with low reflexion, and the device 108 for receiving is then a device for receiving data which can further be used for receiving reflexions which are caused by the test signals, in order to set the apparatus 100 for reducing reflexions in a bus 102 optimally in order to be able to transmit data without reflexions.

A further preferred exemplary embodiment of the present invention comprises a memory component which, in a way similar to the controller just described, has an apparatus 100, described above, for reducing reflexions.

Figure 3:
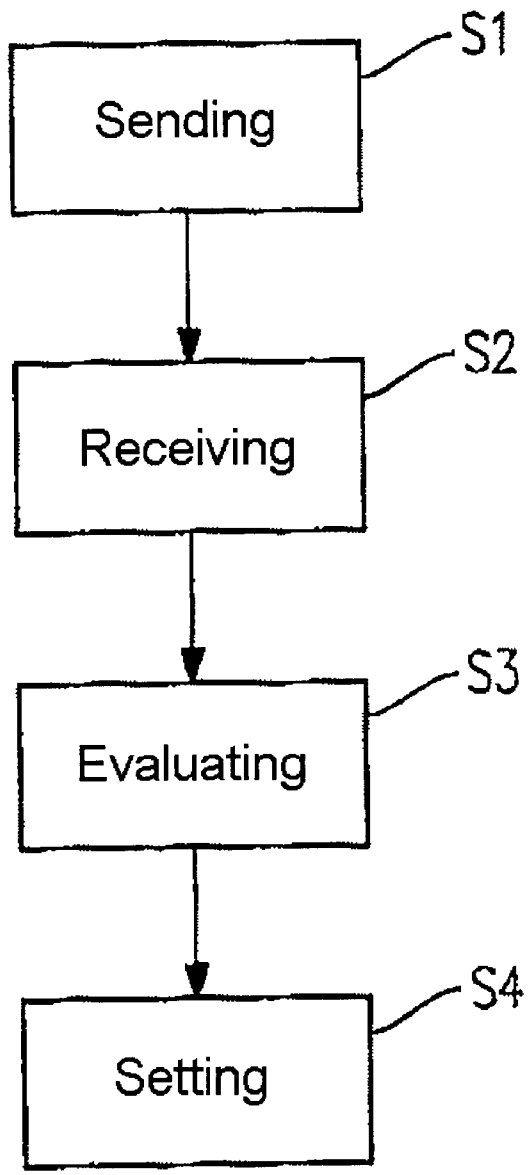
FIG. 3 shows an exemplary embodiment of a method in accordance with the present invention.

FIG. 3 shows a preferred exemplary embodiment of a method for reducing reflexions in a bus 102 for the purpose of transmitting data in accordance with the present invention. In a step S1 of the method according to the invention, a test signal is sent into a input of the bus 102, preferably by the above-described device 106 for sending a test signal. Subsequently, reflexions from the bus 102 which are caused by the sent test signal in the bus 102 are received, preferably by the above-described device 108 for receiving reflexions. In a step S3, the reflexions from the bus 102 are preferably evaluated by the above-described device 110 for evaluating reflexions, in order to supply an evaluation result, and the impedance $Z_{IN}$ at the input of the bus 102 is set in a step S4 as a function of the evaluation result, in order to reduce reflexions of the bus 102.

The steps of evaluating S3 and setting S4 also include controlling the impedance as a function of the evaluation result, preferably by the device 110 for evaluating and setting, in such a way that said impedance is constant over the frequency. The step of receiving S2 can include, furthermore, the step of detecting the settling time and the hold time of data which are represented by the test signal, preferably by the above-described device 108 for receiving reflexions, which preferably has a detecting amplifier. Furthermore, the steps of evaluating S3 and setting S4 can preferably include setting the impedance $Z_{IN}$, preferably by the above-described device 110 for evaluating and setting, in such a way that the settling time and hold time are optimized and, furthermore, preferably the step of setting the impedance $Z_{IN}$ in such a way that overshooting and undershooting in the bus 102 are reduced. The steps of evaluating S3 and setting S4 can include, furthermore, the step of setting the transmission strength and the time profile of the transmission strength in the step S2 of sending, preferably by the device 106 for sending, in such a way that the data alignment in the bus 102 is maintained. Finally, the steps of evaluating S3 and setting S4 can preferably include the step of storing the setting values for the impedance, the transmission strength and the time profile of the transmission strength for assigned test signals, preferably in the memory of the above-described device 110 for evaluating and setting.

Although the present invention is described with the aid of preferred exemplary embodiments, it is not limited thereto, but can be modified in multifarious ways.

An advantage of the present invention consists in that the same permits the reliable operation of, for example, a memory subsystem bus with connected memory components, for example DRAM memories, over a wide operating range and, in particular, a wide frequency range.

What is claimed is:

1. Apparatus for reducing reflexions in a bus for transmitting data, having the following features:
   an output which is connected to the input of the bus;
   a device for sending a test signal into the input of the bus, the device for sending being connected to the output;
   a device for receiving reflexions from the bus, which is connected to the output; and
   a device for evaluating the reflexions from the bus, in order to supply an evaluation result, and for setting the impedance at the output as a function of the evaluation result, in order to reduce the reflexions from the bus.

2. Apparatus according to claim 1, in which the device for evaluating and setting is arranged in order to control the impedance as a function of the evaluation result in such a way that said impedance is constant over the frequency.

3. Apparatus according to claim 1, in which the device for receiving is a detecting amplifier which detects the settling time and the hold time of data, which are represented by the test signal, at the device for receiving.

4. Apparatus according to claim 3, in which the device for evaluating and setting is arranged in order to set the impedance in such a way that the settling time and the hold time are optimized.

5. Apparatus according to claim 1, in which the device for evaluating and setting is arranged, furthermore, in order to set the impedance in such a way that overshooting and undershooting in the bus are reduced.

6. Apparatus according to claim 1, in which the device for evaluating and setting is arranged, furthermore, in order to set the transmission strength and the time profile of the transmission strength of the device for sending in such a way that the data alignment in the bus is maintained.

7. Apparatus according to claim 1, in which the device for evaluating and setting has a memory in which setting values for the impedance, the transmission strength and the time profile of the transmission strength for assigned test signals are stored.

8. Apparatus according to claim 1, in which the test signal is a digital signal which has a predefined bit pattern.

9. Apparatus according to claim 1, in which the impedance is a series impedance which has a first input, a second input and an output which is connected to the output, there being connected between the first input and the output a first impedance whose impedance value can be controlled, and between the output and the second input a second impedance whose impedance value can be controlled.

10. Apparatus according to claim 9, in which the first impedance has a first transistor whose impedance value can be controlled, and the second impedance has a second transistor whose impedance value can be controlled.

11. Apparatus according to claim 10, in which the first transistor is connected to a first power supply in a controllable fashion via a third transistor, which is controlled by the device for evaluating and setting, and the second transistor is connected to a second power supply in a controllable fashion via a fourth transistor, which is controlled by the device for evaluating and setting.

12. Apparatus according to claim 11, in which the first, second, third and fourth transistors in each case have a control input which is connected to the device for evaluating and setting.

13. Apparatus according to claim 12, in which the first and the second transistor in each case have a JFET transistor, and the third and the fourth transistor in each case have a MOSFET transistor.

14. Apparatus according to claim 1, in which the bus has a memory subsystem bus to which memory components can be connected.

15. Apparatus according to claim 13, in which the memory components have dynamic random access memory (DRAM) memory components.

16. Controller for a bus, which has an apparatus according to one of claim 1, and in which the device for sending is a device for sending data, and the device for receiving is a device for receiving data.

17. Memory component which has an apparatus according to claim 1.

18. Method for reducing reflexions in a bus for transmitting data, having the following features:

sending a test signal into an input of the bus;

receiving reflexions from the bus; and evaluating the reflexions from the bus, in order to supply an evaluation result, and setting an impedance at the input of the bus as a function of the evaluation result, in order to reduce the reflexions from the bus.

19. Method according to claim 18, in which the steps for evaluating and setting further have the following step:

controlling the impedance as a function of the evaluation result in such a way that the impedance is constant over the frequency.

20. Method according to claim 19, in which the step of receiving further has the following step:

detecting the settling time and the holding time of data which are represented by the test signal.

21. Method according to claim 20, in which the steps of evaluating and setting further have the following step:

setting the impedance in such a way that the settling time and the holding time are optimized.

22. Method according to claim 20, in which the steps of evaluating and setting further have the following step:

setting the impedance in such a way that overshooting and undershooting in the bus are reduced.

23. Method according to claim 18, in which the steps of evaluating and setting further have the following step:

setting the transmission strength and the time profile of the transmission strength in the step of sending in such a way that the data alignment in the bus is maintained.

24. Method according to claim 17, in which the steps of evaluating and setting further have the following step:

storing the setting values for the impedance, the transmission strength and the time profile of the transmission strength for assigned test signals.

* * * * *